United States Patent
Jinno

(10) Patent No.: US 8,195,350 B2
(45) Date of Patent: Jun. 5, 2012

(54) VEHICLE AND CONTROL METHOD THEREOF

(75) Inventor: Kunihiko Jinno, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 432 days.

(21) Appl. No.: 12/522,226

(22) PCT Filed: Oct. 25, 2007

(86) PCT No.: PCT/JP2007/070791
§ 371 (c)(1),
(2), (4) Date: Jul. 6, 2009

(87) PCT Pub. No.: WO2008/087773
PCT Pub. Date: Jul. 24, 2008

(65) Prior Publication Data
US 2010/0030416 A1 Feb. 4, 2010

(30) Foreign Application Priority Data
Jan. 15, 2007 (JP) .................................. 2007-006066

(51) Int. Cl.
*B60W 10/08* (2006.01)
*B60L 11/18* (2006.01)
*F02D 29/06* (2006.01)
*G06F 17/00* (2006.01)

(52) U.S. Cl. .................. 701/22; 180/65.28; 180/65.285; 180/65.8

(58) Field of Classification Search .................. None
See application file for complete search history.

(56) References Cited

U.S. PATENT DOCUMENTS

| 6,073,456 A | 6/2000 | Kawai et al. |
| 2002/0195288 A1* | 12/2002 | Komiyama et al. .......... 180/65.4 |
| 2007/0298928 A1* | 12/2007 | Yamanaka et al. ............. 477/15 |

FOREIGN PATENT DOCUMENTS

| DE | 600 29 811 T2 | 8/2006 |
| EP | 1 224 092 B1 | 8/2006 |
| JP | 07-023504 A | 1/1995 |
| JP | 11-180137 A | 7/1999 |
| JP | 2001-099103 A | 4/2001 |
| JP | 2001-173024 A | 6/2001 |
| JP | 2001-254643 A | 9/2001 |
| JP | 2005-337173 A | 12/2005 |
| JP | 2006-151039 A | 6/2006 |

* cited by examiner

*Primary Examiner* — Michael J. Zanelli
(74) *Attorney, Agent, or Firm* — Sughrue Mion, PLLC

(57) ABSTRACT

In a hybrid vehicle 20, when the ECO switch 88 is turned on, a maximum allowable charging power Pcmax is set based on a vehicle speed and an ECO mode maximum allowable charging power setting map that is a second relationship having a tendency to allow charging of a battery 50 in comparison with a normal maximum allowable charging power setting map (Step S130), and an engine 22, motors MG1 and MG2 are controlled so that the battery 50 is charged with an effective charge-discharge power demand Pb* as a charging power demand set at Step S140 in accordance with state of the battery 50 within a range of the maximum allowable charging power Pcmax and a torque demand Tr* for driving is ensured (Steps S150-S280).

10 Claims, 9 Drawing Sheets

VEHICLE AND CONTROL METHOD THEREOF

TECHNICAL FIELD

The present invention relates to a vehicle and a control method thereof.

BACKGROUND ART

Conventionally, there is proposed a vehicle including a battery and a capacitor (for example, refer to Patent Document 1). In the vehicle, an engine is operated in the vicinity of a maximum efficiency point and the capacitor is charged with electric power from a generator when a charge amount of the battery is not more than a predetermined value, and the battery is charged with electric power from the capacitor after the charge amount of the battery reaches the predetermined value. Such a control of the charging improves fuel consumption rate of the vehicle.

[Patent Document 1] Japanese Patent Laid-Open No. 7-23504

DISCLOSURE OF THE INVENTION

However, the above vehicle has a complex structure because it includes the capacitor for improving fuel consumption rate. Further, in the above vehicle, the engine is operated at high efficiency operation points so as to improve fuel consumption rate when charging the battery. However, if the engine is operated at high efficiency operation points to charge the battery during stopping of the vehicle or low speed driving, the engine generates high rotational speed and high torque that are not required for driving, so that a driver and passengers may feel discomfort due to engine noise and vibration. Further, some drivers may choose an improvement of fuel consumption even if they feel such a discomfort.

The present invention has an object to allow to freely select any one of an improvement of fuel consumption rate and a reduction of noise and vibration as a priority.

The present invention accomplishes the demand mentioned above by the following configurations applied to a vehicle and a control method thereof.

A vehicle according to the present invention is a vehicle including: an internal combustion engine capable of outputting power for driving; a generator capable of generating electric power through the use of at least part of power from the internal combustion engine; an accumulator capable of receiving electric power from the generator; a fuel consumption rate priority mode selection switch to select a fuel consumption rate priority mode that gives priority to fuel consumption rate; a maximum allowable charging power setting module configured to set a maximum allowable charging power based on a first relationship when the fuel consumption rate priority mode selection switch is turned off, the maximum allowable charging power being a maximum electric power allowed to charge the accumulator, the maximum allowable charging power setting module setting the maximum allowable charging power based on a second relationship having a tendency to allow charging of the accumulator in comparison with the first relationship when the fuel consumption rate priority mode selection switch is turned on; a charging power demand setting module configured to set a charging power demand required for charging the accumulator within a range of the set maximum allowable charging power in accordance with a state of the accumulator; a power demand setting module configured to set a power demand required for the vehicle; and a control module configured to control the internal combustion engine and the generator so that the accumulator is charged with the set charging power demand and the set power demand is ensured.

In the vehicle, the maximum allowable charging power that is the maximum electric power allowed to charge the accumulator is set based on the first relationship when the fuel consumption rate priority mode selection switch is turned off. When the fuel consumption rate priority mode selection switch is turned on, the maximum allowable charging power is set based on the second relationship having the tendency to allow charging of the accumulator in comparison with the first relationship. Then, the internal combustion engine and the generator are controlled so that the accumulator is charged with the charging power demand set within the range of the maximum allowable charging power in accordance with a state of the accumulator and the power demand required for the vehicle is ensured. Thus, in the vehicle, when the fuel consumption rate priority mode selection switch is turned off, the charging of the accumulator with electric power generated by the generator is slightly restricted, however, it is possible to reduce noise and vibration resulting from the operation of the internal combustion engine at relatively high rotational speed and/or relatively high torque. When the fuel consumption rate priority mode selection switch is turned on, the charging of the accumulator with electric power generated by the generator is enhanced, so that noise and vibration may be caused by the operation of the internal combustion engine at relatively high rotational speed and/or relatively high torque, however, it is possible to improve fuel consumption rate because the internal combustion engine can be operated at high efficiency operation points. Accordingly, in the vehicle, it is possible to allow drivers and the like to freely select any one of the improvement of fuel consumption rate and the reduction of noise and vibration as a priority by only operating the fuel consumption rate priority mode selection switch.

The vehicle may further includes a vehicle speed detecting unit that detects a vehicle speed of the vehicle, the first and second relationships may have a tendency to decrease the maximum allowable charging power as the detected vehicle speed decreases respectively, and the second relationship may increase the maximum allowable charging power corresponding to same vehicle speed in comparison with the first relationship. By applying the first and second relationships that decrease the maximum allowable charging power as the detected vehicle speed decreases, road noise and the like may mask noise and vibration from the internal combustion engine. Further, by applying the second relationship increasing the maximum allowable charging power corresponding to same vehicle speed in comparison with the first relationship, it is possible to allow to charge the accumulator in comparison with the turn-off condition of the fuel consumption rate priority mode selection switch when it is turned on.

The charging power demand setting module may set the charging power demand to a smaller one of a base charging electric power according to the state of the accumulator and the set maximum allowable charging power.

The control module may be capable of controlling the internal combustion engine based on a power demand including power required to ensure driving force demand for driving and power required to charge the accumulator with the set charging power demand so that the internal combustion engine is intermittently operated. In the vehicle, when the fuel consumption rate priority mode selection switch is turned on, it is possible to enhance the charging of the accumulator with electric power from the generator by operating the internal combustion engine efficiently thereby permitting an intermittent operation of the internal combustion engine and improving fuel consumption rate.

The vehicle may further includes a motor capable of outputting power for driving to a predetermined axle through the use of at least electric power from the accumulator. In this case, the generator may be a unit connected to the predetermined axle and an output shaft of the internal combustion engine and configured to input and output to the output shaft side and the axle side with input/output of electric power and mechanical power. Further, the vehicle may further include a continuously variable transmission capable of transmitting power from the internal combustion engine to the axle or another axle different from the axle.

A control method of a vehicle according to the present invention is a control method of a vehicle including an internal combustion engine capable of outputting power for driving, a generator capable of generating electric power through the use of at least part of power from the internal combustion engine, an accumulator capable of receiving electric power from the generator, and a fuel consumption rate priority mode selection switch to select a fuel consumption rate priority mode that gives priority to fuel consumption rate, the method including the steps of:

(a) setting a maximum allowable charging power based on a first relationship when the fuel consumption rate priority mode selection switch is turned off, the maximum allowable charging power being a maximum electric power allowed to charge the accumulator, the step (a) setting the maximum allowable charging power based on a second relationship having a tendency to allow charging of the accumulator in comparison with the first relationship when the fuel consumption rate priority mode selection switch is turned on;

(b) setting a charging power demand required for charging the accumulator within a range of the maximum allowable charging power set at the step (a) in accordance with a state of the accumulator; and (c) controlling the internal combustion engine and the generator so that the accumulator is charged with the charging power demand set at the step (b) and power demand required for the vehicle is ensured.

According to the method, when the fuel consumption rate priority mode selection switch is turned off, the charging of the accumulator with electric power generated by the generator is slightly restricted, however, it is possible to reduce noise and vibration resulting from the operation of the internal combustion engine at relatively high rotational speed and/or relatively high torque. When the fuel consumption rate priority mode selection switch is turned on, the charging of the accumulator with electric power generated by the generator is enhanced, so that noise and vibration may be caused by the operation of the internal combustion engine at relatively high rotational speed and/or relatively high torque, however, it is possible to improve fuel consumption rate because the internal combustion engine can be operated at high efficiency operation points. Accordingly, in the method, it is possible to allow drivers and the like to freely select any one of the improvement of fuel consumption rate and the reduction of noise and vibration as a priority by only operating the fuel consumption rate priority mode selection switch.

The first and second relationships used at the step (a) respectively may have a tendency to decrease the maximum allowable charging power as a vehicle speed decreases, and wherein the second relationship increases the maximum allowable charging power corresponding to same vehicle speed in comparison with the first relationship. The step (b) may set the charging power demand to a smaller one of a base charging electric power according to the state of the accumulator and the set maximum allowable charging power.

BEST MODES OF CARRYING OUT THE INVENTION

Now, the best mode for carrying out the present invention will be described with reference to an embodiment.

Figure 1:
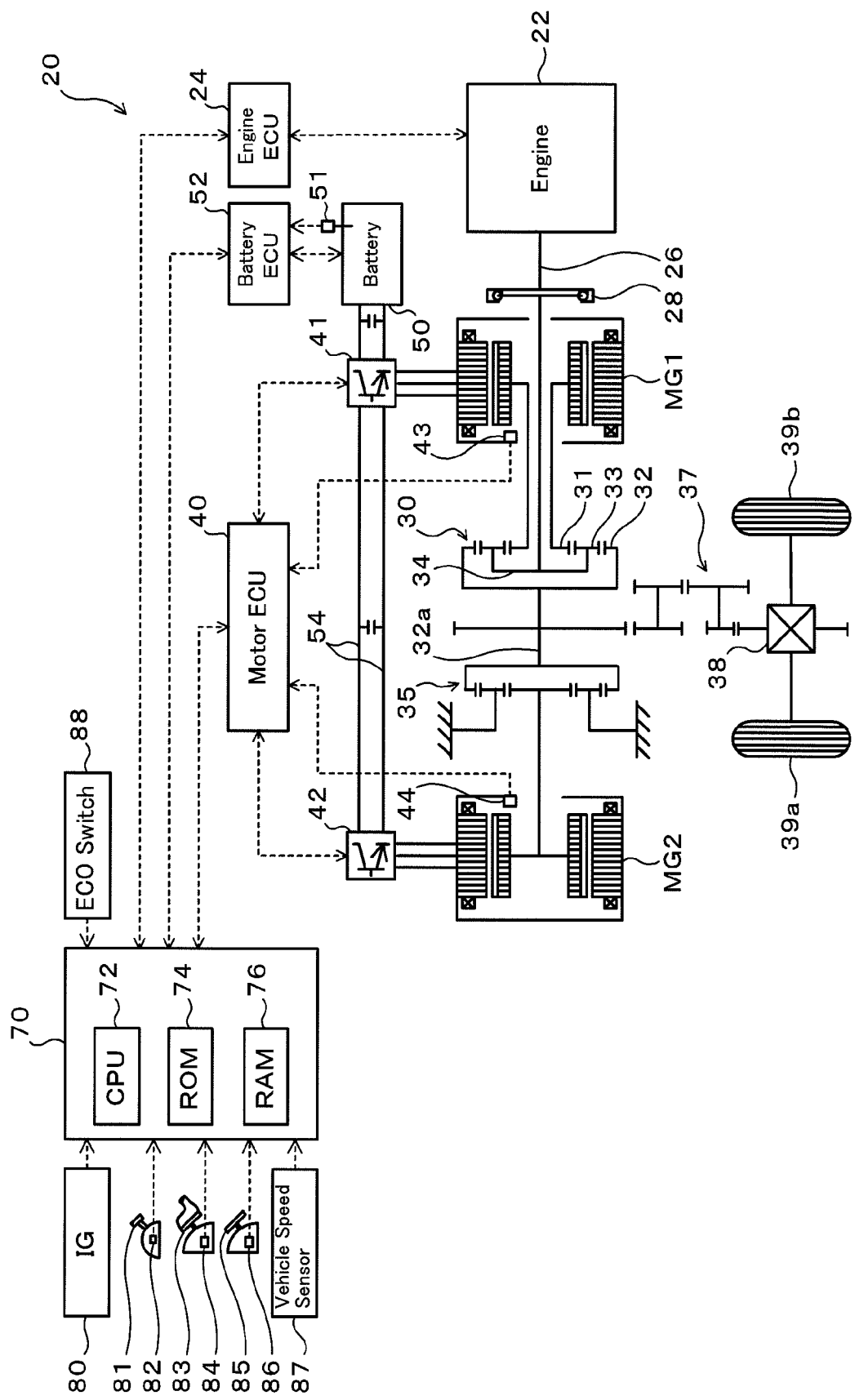
FIG. 1 is a schematic block diagram of a hybrid vehicle 20 according to an embodiment of the present invention.

FIG. 1 schematically illustrates the configuration of a hybrid vehicle 20 in an embodiment of the invention. The hybrid vehicle 20 of the illustrated configuration includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a as an axle connected to the power distribution integration mechanism 30, a motor MG2 connected to the ring gear shaft 32a via the reduction gear 35, and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generate power. The engine 22 is under operation controls, such as fuel injection control, ignition timing control, and intake air flow control, of an engine electronic control unit 24 (hereinafter referred to as "engine ECU"). The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as an engine-side rotational element, the sun gear 31, and the ring gear 32 as an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereinafter referred to as "battery ECU"). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 and the engine ECU 24 according to the requirements. The battery ECU 52 also executes various arithmetic operations for management and control of the battery 50. A remaining capacity or state of charge SOC of the battery 50 is calculated from an integrated value of the charge-discharge current measured by the current sensor.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. An ECO switch (fuel consumption rate priority mode selection switch) 88 to select, as a control mode at a time of driving, an ECO mode (fuel consumption rate priority mode) that gives priority to fuel consumption rate over a reduction of noise and vibration is disposed in the vicinity of the driver's seat of the hybrid vehicle 20 of the present embodiment. The ECO switch 88 is also connected to the hybrid ECU 70. When the ECO switch 88 is turned on by the driver or the like, a predetermined ECO flag Feco that is set to value "0" during normal operation (when the ECO switch 88 is turned off) is set to value "1", and the hybrid vehicle 20 is controlled according to various control procedures that are previously defined to give priority to efficiency. As described above, the hybrid ECU 70 is connected via the communication port with the engine ECU 24, the motor ECU 40, the battery ECU 52, and the like, and exchanges various control signals and data with the engine ECU 24, the motor ECU 40, the battery ECU 52, and the like.

The hybrid vehicle 20 of the embodiment constructed as described above sets a torque demand, which is to be output to the ring gear shaft 32a or the driveshaft linked with an axle of the hybrid vehicle 20, based on the vehicle speed V and the accelerator opening Acc corresponding to the driver's depression amount of the accelerator pedal 83, and controls the operations of the engine 22, the motors MG1 and MG2 to ensure output of power equivalent to the set torque demand to the ring gear shaft 32a. There are several drive control modes of the engine 22, the motors MG1 and MG2. In a torque conversion drive mode, while the engine 22 is driven and controlled to ensure output of the power equivalent to the torque demand, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the power demand to the ring gear shaft 32a, while the engine 22 stops its operation.

Figure 2:
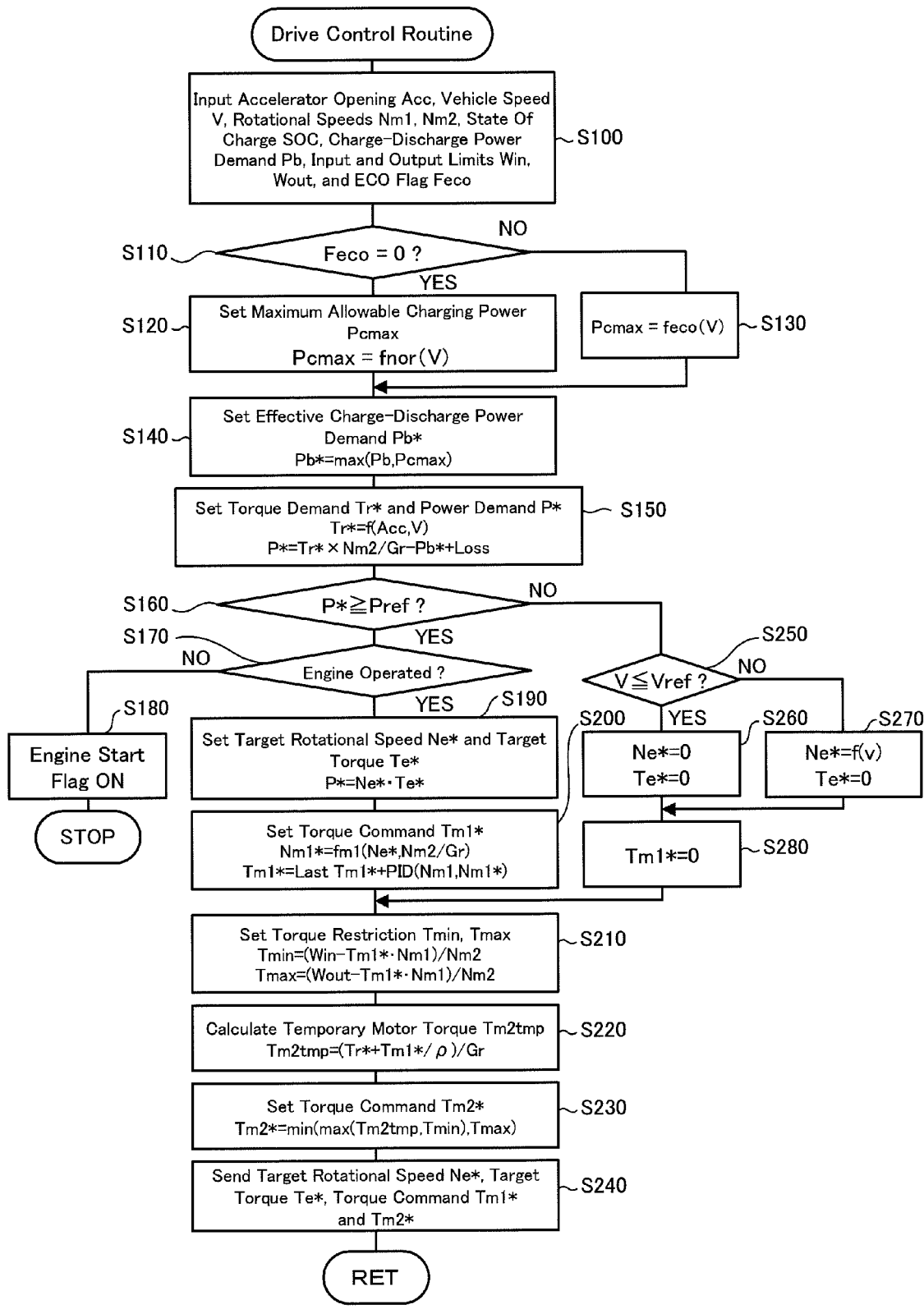
FIG. 2 is a flowchart illustrating an example of a drive control routine executed by a hybrid electric control unit 70 in the embodiment.

Next, the operation of the hybrid vehicle 20 with the above configuration will be described. FIG. 2 is a flowchart illustrating an example of a drive control routine that is executed by the hybrid ECU 70 at predetermined time intervals (for example, at every several msec).

Figure 3:
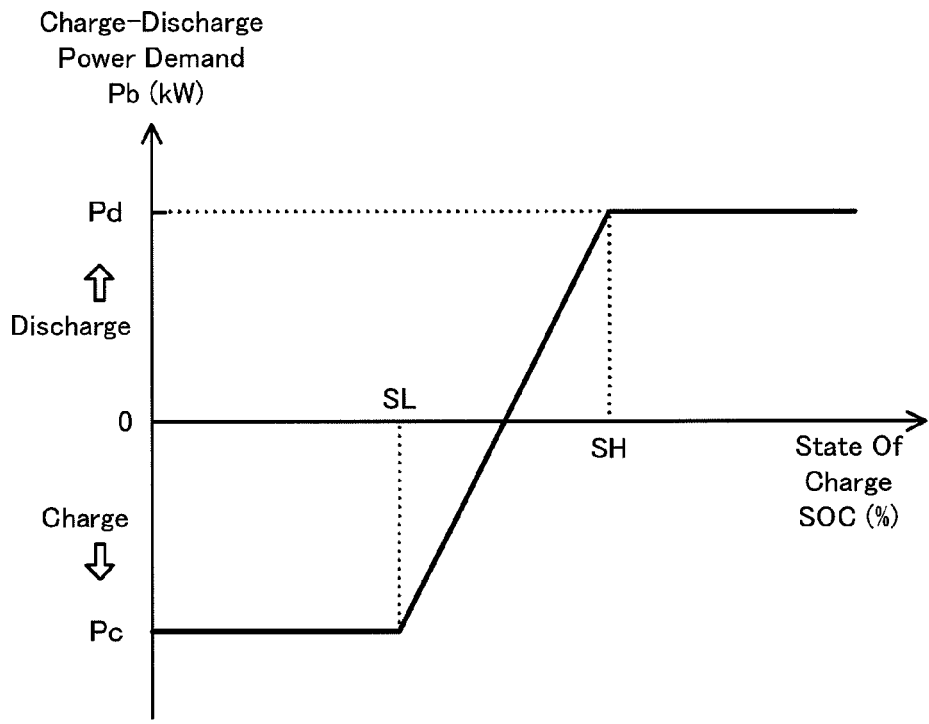
FIG. 3 is a view illustrating an example of a charge-discharge power demand setting map.

At start of the drive control routine in FIG. 2, the CPU 72 of the hybrid ECU 70 executes input processing of data required for control such as the accelerator opening Acc from the accelerator pedal position sensor 84, the vehicle speed V from the vehicle speed sensor 87, the rotational speeds Nm1, Nm2 of the motors MG1, MG2, the state of charge SOC of the battery 50, a charge-discharge power demand Pb, an input limit Win that is an allowable charging electric power to be charged into the battery 50 and an output limit Wout that is an allowable discharging electric power to be discharged from the battery 50, and a value of the ECO flag Feco (Step S100). The rotational speeds Nm1 and Nm2 of the motors MG1 and MG2 are input from the motor ECU 40 by communication. The state of charge SOC and the charge-discharge power demand Pb of the battery 50 are input from the battery ECU 52 by communication. In the embodiment, the battery ECU 52 derives and sets the charge-discharge power demand Pb corresponding to the state of charge SOC based on an integrated value of the charge-discharge current from a charge-discharge power demand setting map previously stored in the ROM (not shown) of the battery ECU 52 and defining a relationship between the state of charge SOC and the charge-discharge power demand Pb. FIG. 3 illustrates an example of the charge-discharge power demand setting map. As shown in FIG. 3, the charge-discharge power demand setting map sets the charge-discharge power demand Pb to a constant charge amount Pc when the state of charge SOC is less than a low remainder side threshold value SL and sets the charge-discharge power demand Pb to a constant discharge amount Pd when the state of charge SOC is equal to or more than a high remainder side threshold value SH. Also, the charge-discharge power demand setting map sets the charge-discharge power demand Pb so as to increase or decrease in proportion to the state of charge SOC at a predetermined gradient when the state of charge SOC is equal to or more than the low remainder side threshold value SL and less than the high remainder side threshold value SH. Hereinafter, it is assumed that the charge-discharge power demand Pb becomes negative on a charge demand side and becomes positive on a discharge demand side. The input limit Win and the output limit Wout are set based on the battery temperature Tb of the battery 50 and the state of charge SOC of the battery 50 and are input from the battery ECU 52 by communication.

Figure 4:
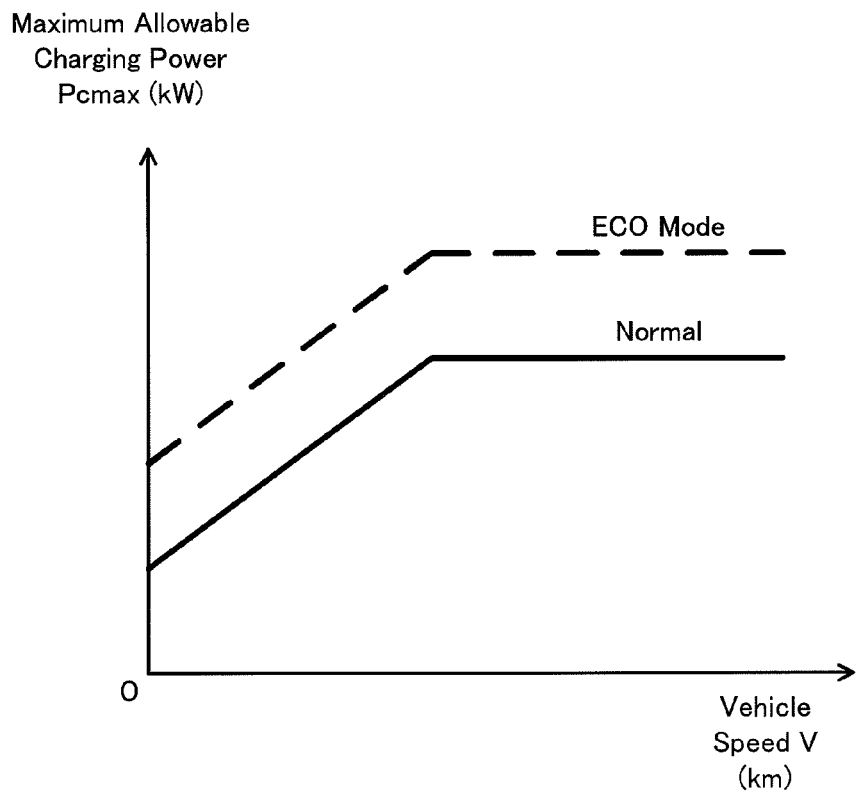
FIG. 4 is a view exemplifying a normal maximum allowable charging power setting map and an ECO mode maximum allowable charging power setting map.

Then, the CPU 72 determines whether or not the input ECO flag Feco is value "0", that is, whether or not the ECO switch 88 is turned off by the driver or the like (Step S110). When the ECO switch 88 is turned off and the value of the ECO flag Feco is value "0", the CPU 72 sets a maximum allowable charging power Pcmax (a negative value in the embodiment) that is a maximum electric power allowed to charge the battery 50 based on the vehicle speed V input at Step S100 and a normal maximum allowable charging power setting map as a first relationship (Step S120). On the other hand, when the ECO switch 88 is turned on and the value of the ECO flag Feco is value "1", the CPU 72 sets the maximum allowable charging power Pcmax based on the vehicle speed V input at Step S100 and an ECO mode maximum allowable charging power setting map as a second relationship (Step S130). As shown FIG. 4, the normal maximum allowable charging power setting map (see a broken line of FIG. 4) and the ECO mode maximum allowable charging power setting map (see a solid line of FIG. 4) respectively define a relationship between the vehicle speed V and the maximum allowable charging Pcmax and are stored in the ROM 74. The normal maximum allowable charging power setting map and the ECO mode maximum allowable charging power setting map respectively have a tendency to decrease the maximum allowable charging power Pcmax as the vehicle speed V decreases respectively. The ECO mode maximum allowable charging power setting map increases the maximum allowable charging power Pcmax corresponding to same vehicle speed V in comparison with the normal maximum allowable charging power setting map. At Steps S120 or S130, the maximum allowable charging power Pcmax corresponding to the given vehicle speed V is derived and set from the normal maximum allowable charging power setting map or the ECO mode maximum allowable charging power setting map.

Figure 5:
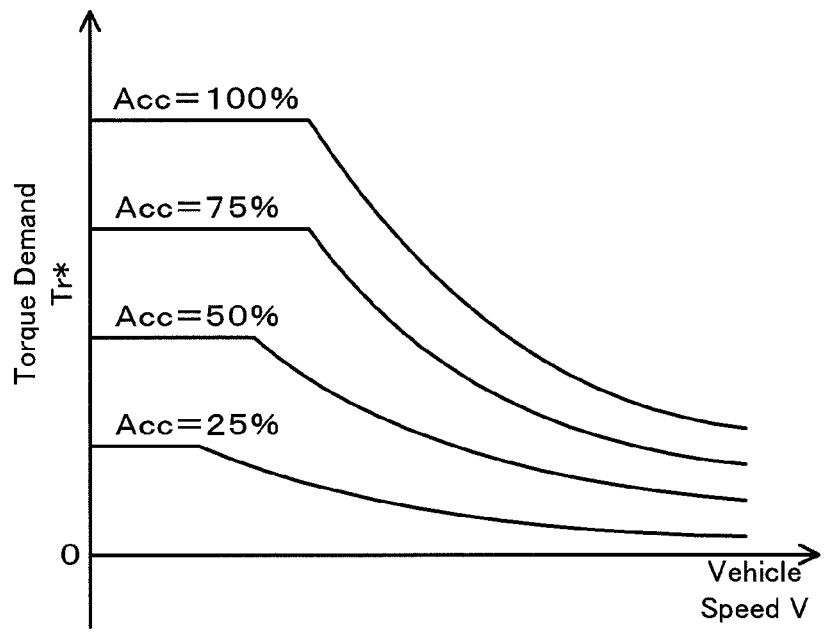
FIG. 5 is a view illustrating an example of a torque demand setting map.

After setting the maximum allowable charging power Pcmax, the CPU 72 sets an effective charge-discharge power demand Pb* set maximum allowable charging power to a larger one of the set maximum allowable charging power Pcmax and the charge-discharge power demand Pb input at Step S100 (Step S140). In the embodiment, the charge-discharge power demand Pb becomes negative on the charge demand side and becomes positive on the discharge demand side. Accordingly, the charge-discharge power demand Pd is set as the effective charge-discharge power demand Pb* at Step S140 when the charge-discharge power demand Pd is positive on the discharge demand side. Further, the effective charge-discharge power demand Pb* is set to a larger one of the charge-discharge power demand Pd and the maximum allowable charging power Pcmax, that is a smaller one of them as the charging electric power when the charge-discharge power demand Pd input at Step S100 is negative on the charge demand side (is a base charging electric power). Then, the CPU 72 sets a torque demand Tr* to be output to the ring gear shaft 32a or the axle connected to drive wheels 39a and 39b based on the input accelerator opening Acc and the input vehicle speed V, and sets a power demand P* required for whole of the vehicle (Step S150). In the embodiment, the torque demand Tr* corresponding to the given accelerator opening Acc and the given vehicle speed V is derived from a torque demand setting map previously stored in the ROM 74 and defining a relationship between the accelerator opening Acc, the vehicle speed V and the torque demand Tr*. FIG. 5 illustrates an example of the torque demand setting map. In the embodiment, the power demand P* is calculated as the sum of a product of the set torque demand Tr* and a rotational speed Nr of the ring gear shaft 32a, the charge-discharge power demand Pb* (where positive values represent discharge demands), and a potential loss. The rotational speed Nr of the ring gear shaft 32a is obtained by dividing the rotational speed Nm2 of the motor MG2 by a gear ratio Gr of the reduction gear 35 or by multiplying the vehicle speed V by a predetermined conversion factor k. Then, the CPU 72 determines whether or not the set power demand P* is equal to or more than a predetermined threshold value Pref (Step S160). When the power demand P* is equal to or more than the threshold value Pref, the CPU 72 considers the power demand P* to be output from the engine 22 and determines whether or not the engine 22 is operated (Step S170). When the operation of the engine 22 is stopped, the CPU 72 sets an engine start flag to instruct an execution of a drive control routine for starting the engine that is not shown (Step S180) and terminates the routine. A detailed description of the drive control routine for starting the engine is omitted because it does not form a core of the invention.

Figure 6:
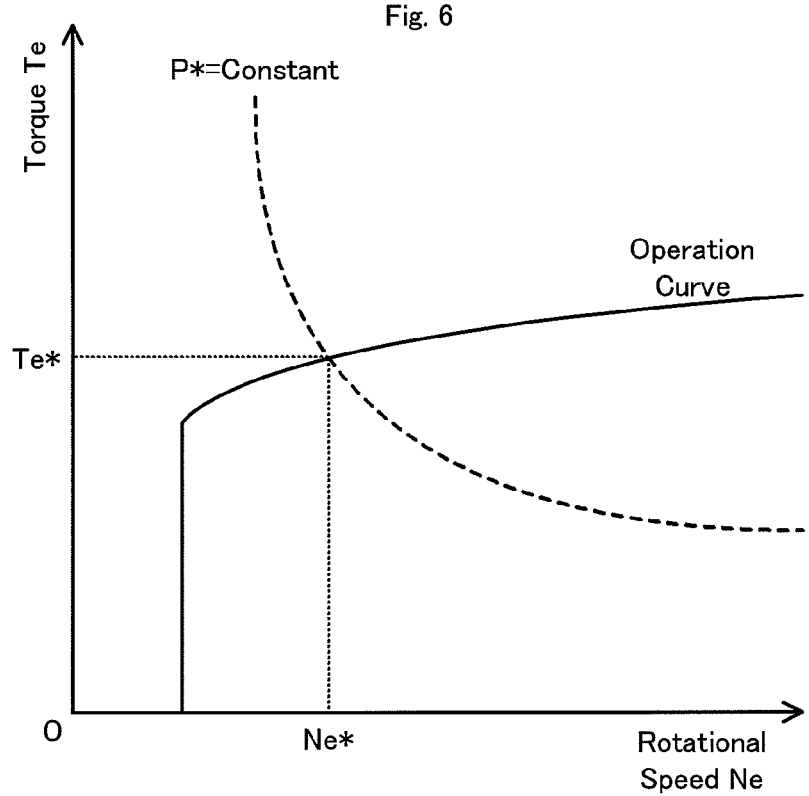
FIG. 6 is a view illustrating an operation curve of the engine 22 and a correlation curve between a target rotational speed Ne* and a target torque Te*.
Figure 7:
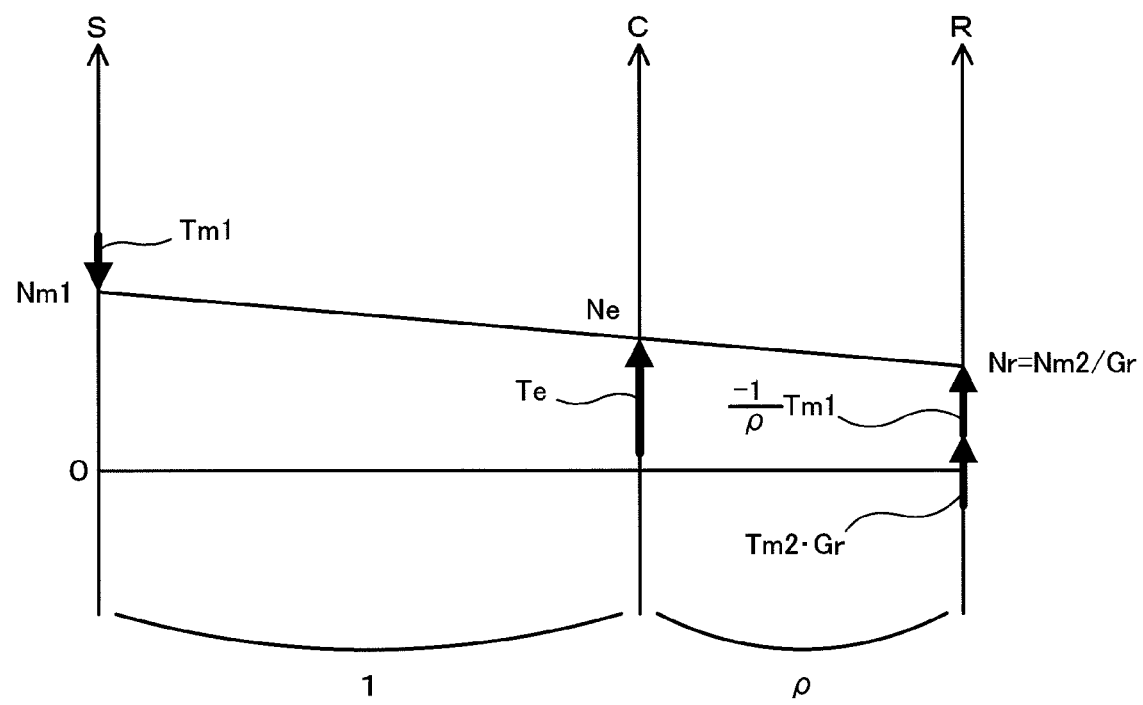
FIG. 7 is a view illustrating an alignment chart showing a dynamic relationship between a rotational speed and torque of each rotating element of a power distribution and integration mechanism 30.

When determining that the engine 22 is operated at Step S170, the CPU 72 sets a target rotational speed Ne* and a target torque Te* as a target drive point of the engine 22 so that the engine 22 is operated with high efficiency, based on the power demand P* set at Step S150 (Step S190). In the embodiment, the target rotational speed Ne* and the target torque Te* of the engine 22 are set based on a predetermined operation curve for operating the engine 22 with high efficiency and the power demand P*. FIG. 6 illustrates the operation curve of the engine 22 and a correlation curve between the target rotational speed Ne* and the target torque Te*. As shown in FIG. 6, the target rotational speed Ne* and the target torque Te* can be obtained from an intersection between the operation curve and the correlation curve indicating a constant power demand P* (Ne*×Te*). After setting the target rotational speed Ne* and the target torque Te* of the engine 22, the CPU 72 calculates a target rotational speed Nm1* of the motor MG1 from the set target rotational speed Ne*, the rotational speed Nr (=Nm2/Gr) of the ring gear shaft 32a, and a gear ratio ρ of the power distribution integration mechanism 30 (a quotient of the number of teeth of the sun gear 31 by the number of teeth of the ring gear 32) according to Equation (1) given below. Then, CPU 72 computes a torque command Tm1* of the motor MG1 by calculation of below Equation (2) based on the calculated target rotational speed Nm1* and a current rotational speed Nm1 of the motor MG1 (Step S200). Equation (1) is a dynamic relational expression of respective rotational elements included in the power distribution integration mechanism 30. FIG. 7 illustrates an alignment chart showing torque-rotational speed dynamics of the respective rotational elements included in the power distribution integration mechanism 30. In FIG. 7, the left axis 'S' represents a rotational speed of the sun gear 31 that is equivalent to the rotational speed Nm1 of the motor MG1, the middle axis 'C', represents a rotational speed of the carrier 34 that is equivalent to the rotational speed Ne of the engine 22, and the right axis 'R' represents the rotational speed Nr of the ring gear 32 obtained by dividing the rotational speed Nm2 of the motor MG2 by the gear ratio Gr of the reduction gear 35. Two thick arrows on the axis 'R' respectively show torque applied to the ring gear shaft 32a by output of the torque Tm1 from the motor MG1, and torque applied to the ring gear shaft 32a via the reduction gear 35 by output of the torque Tm2 from the motor MG2. Equation (1) for computation of the target rotational speed Nm1* of the motor MG1 is readily obtained by taking into account the rotational speed relation in the alignment chart. Equation (2) is a relational expression of feedback control to drive and rotate the motor MG1 at the target rotational speed Nm1*. In Equation (2) given above, 'k1' in the second term and 'k2' in the third term on the right side respectively denote a gain of the proportional and a gain of the integral term.

$$Nm1^* = Ne^* \cdot (1+\rho)/\rho - Nm2/(Gr \cdot \rho) \quad (1)$$

$$Tm1^* = \text{last } Tm1^* + k1(Nm1^* - Nm1) + k2\int(Nm1^* - Nm1)dt \quad (2)$$

After computation of the torque command Tm1* of the motor MG1 at Step S200, the CPU 72 calculates a lower torque restriction Tmin and an upper torque restriction Tmax as allowable minimum and maximum torques to be output from the motor MG2 according to the following equations (3) and (4) by dividing a deviation between the output limit Wout or the input limit Win of the battery 50 and power consumption (generated electric power) of the motor MG1 that is a product of the torque command Tm1* and the current rotational speed Nm1 of the motor MG1 by the rotational speed Nm2 of the motor MG2 (Step S210). Next, the CPU 72 calculates a temporary motor torque Tm2tmp as a torque value to be output from the motor MG2, based on the torque demand Tr*, the torque command Tm1*, the gear ratio ρ of the power distribution integration mechanism 30, and the gear ratio Gr of the reduction gear 35 according to Equation (5) given below (Step S220). Then, the CPU 72 sets a torque command Tm2* of the motor MG2 to a value obtained by limiting the calculated temporary motor torque Tm2tmp by the lower and the upper torque restrictions Tmin and Tmax (Step S230). Setting the torque command Tm2* of the motor MG2 in this manner restricts the torque to be output to the ring gear shaft 32a or the axle in the range of the input limit Win and the output limit Wout of the battery 50. Equation (5) is readily introduced from the alignment chart of FIG. 7. After setting the target rotational speed Ne* and the target torque Te* of the engine 22 and the torque commands Tm1* and Tm2* of the motors MG1 and MG2, the CPU 72 sends the target rotational speed Ne* and the target torque Te* of the engine 22 to the engine ECU 24 and the torque commands Tm1* and Tm2* of the motors MG1 and MG2 to the motor ECU 40 (Step S240) and returns to Step S100 to repeat the processing of and after Step S100. The engine ECU 24 receives the target rotational speed Ne* and the target torque Te* and performs control to obtain the target rotational speed Ne* and the target torque Te*. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*.

$$T\min = (Win - Tm1^* \cdot Nm1)/Nm2 \quad (3)$$

$$T\max = (Wout - Tm1^* \cdot Nm1)/Nm2 \quad (4)$$

$$Tm2tmp = (Tr^* + Tm1^*/\rho)/Gr \quad (5)$$

On the other hand, when determining that the power demand P* is less than the threshold value Pref, the CPU 72 determines whether or not the vehicle speed V input at Step S100 is equal to or more than a predetermined intermittent permissive ceiling speed Vref (Step S250). In the embodiment, the intermittent permissive ceiling speed Vref is a speed selected within a range from 50-70 km/h for example. When the vehicle speed V is equal to or more than the intermittent permissive ceiling speed Vref, the CPU 72 sets the target rotational speed Ne* and the target torque Te* as the target drive point of the engine 22 to value "0" respectively (Step S260) so as to stop the operation of the engine 22. Further, the CPU 72 sets the torque command Tm1* for the motor MG1 to value "0" (Step S280) and executes the processing of and after Step S210. Thus, in the embodiment, the hybrid vehicle 20 can be driven with power from the motor MG2 because the intermittent operation of the engine 22 is allowed if the vehicle speed V is equal to or less than the intermittent permissive ceiling speed Vref when the power demand P* required for whole of the vehicle is relatively low. Further, when determining that the vehicle speed V is more than the intermittent permissive ceiling speed Vref at Step S250, the CPU 72 does not allow the intermittent operation of the engine and sets the target rotational speed Ne* to an autonomous rotational speed according to the vehicle speed V based on an autonomous rotational speed setting map (not shown) so that the engine 22 is autonomously operated not to substantially output torque, and sets the torque command Tm1* for the motor MG1 to value "0" (Step S270). Then, the CPU 72 executes the processing of Step S280 and after Step S210.

As mentioned above, in the embodiment, the maximum allowable charging power Pcmax is set to a larger value than that of the turn-off condition of the ECO switch 88 when it is turned on. Therefore, in the hybrid vehicle 20, the power demand P* may be set to a relative large value under the turn-on condition of the ECO switch 88 when the power demand P* may set to a relative small value if the ECO switch 88 is turned off (when the vehicle speed V is relatively high and the intermittent operation of the engine 22 is permitted). Accordingly, the engine 22 may be operated at high efficiency operation points for generating high rotational speed and high torque in comparison with the turn-off condition of the ECO switch 88 when it is turned on. Thus, in the hybrid vehicle 20, when the ECO switch 88 is turned on, the charging of the battery 50 with electric power generated by the motor MG1 is enhanced, so that noise and vibration may be caused by the operation of the engine 22 at relatively high rotational speed and/or relatively high torque, however, it is possible to improve fuel consumption rate because the internal combustion can be operated at high efficiency operation points.

As has been described above, in the hybrid vehicle 20 of the embodiment, the maximum allowable charging power Pcmax that is the maximum electric power allowed to charge the battery 50 is set based on the vehicle speed V and the normal maximum allowable charging power setting map as the first relationship when the ECO switch 88 is turned off (Step S120). When the ECO switch 88 is turned on, the maximum allowable charging power Pcmax is set based on the vehicle speed V and the ECO mode maximum allowable charging power setting map as the second relationship having the tendency to allow charging of the battery 50 in comparison with the normal maximum allowable charging power setting map (Step S130). Then, the engine 22, the motors MG1 and MG2 are controlled so that the battery 50 is charged with the effective charge-discharge power demand Pb* set within the range of the maximum allowable charging power Pcmax in accordance with the state of the battery 50 at Step S140 and the torque demand Tr* required for the vehicle 20 is ensured (Steps S150-S280). Thus, in the hybrid vehicle 20, when the ECO switch 88 is turned off, the charging of the battery 50 with electric power generated by the motor MG1 is slightly restricted, however, it is possible to reduce noise and vibration resulting from the operation of the engine 22 at relatively high rotational speed and/or relatively high torque that are not required for driving. When the ECO switch 88 is turned on, the charging of the battery 50 with electric power generated by the motor MG1 is enhanced, so that noise and vibration may be caused by the operation of the engine 22 at relatively high rotational speed and/or relatively high torque, however, it is possible to improve fuel consumption rate because the engine 22 can be operated at high efficiency operation points. Accordingly, in the hybrid vehicle 20 of the embodiment, it is possible to allow drivers and the like to freely select any one of the improvement of fuel consumption rate and the reduction of noise and vibration as the priority by only operating the ECO switch 88.

Further, by applying the normal maximum allowable charging power setting map and the ECO mode maximum allowable charging power setting map that decrease the maximum allowable charging power Pcmax as the vehicle speed V decreases, road noise and the like may mask noise and vibration from the engine 22. Further, by applying the ECO mode maximum allowable charging power setting map increasing the maximum allowable charging power Pcmax corresponding to same vehicle speed V in comparison with the normal maximum allowable charging power setting map, it is possible to allow to charge the battery 50 in comparison with the turn-off condition of the ECO switch 88 when it is turned on. Further, in the hybrid vehicle 20, when the ECO switch 88 is turned on, it is possible to enhance the charging of the battery 50 with electric power from the motor MG1 by operating the engine 22 efficiently thereby permitting an intermittent operation of the engine 22 based on the power demand P* including power required to ensure torque demand Tr* (Tr*× Nm2/Gr) and the effective charge-discharge power demand Pb* required to charge the battery 50 and improving fuel consumption rate.

Figure 8:
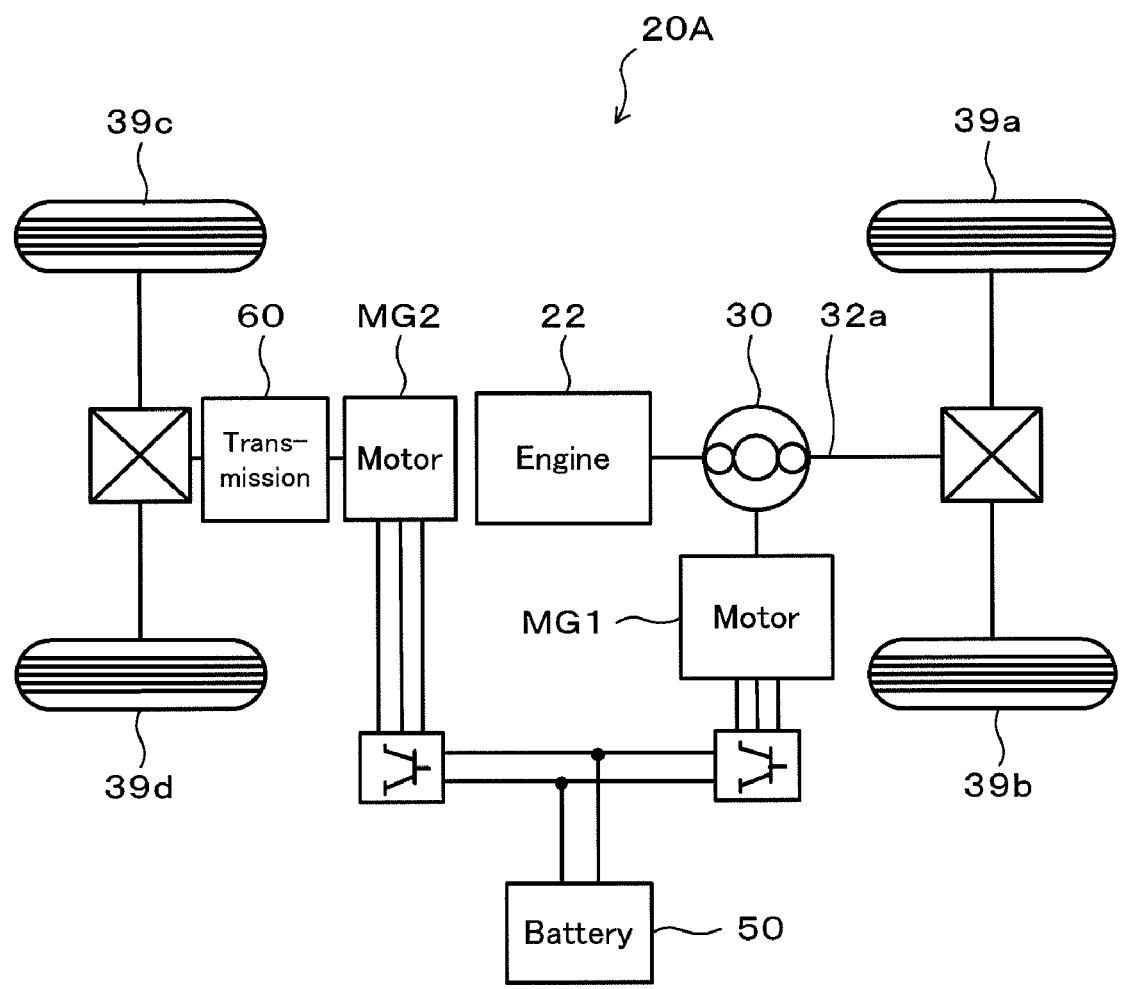
FIG. 8 is a schematic block diagram of a hybrid vehicle 20A according to a modification of the present invention.
Figure 9:
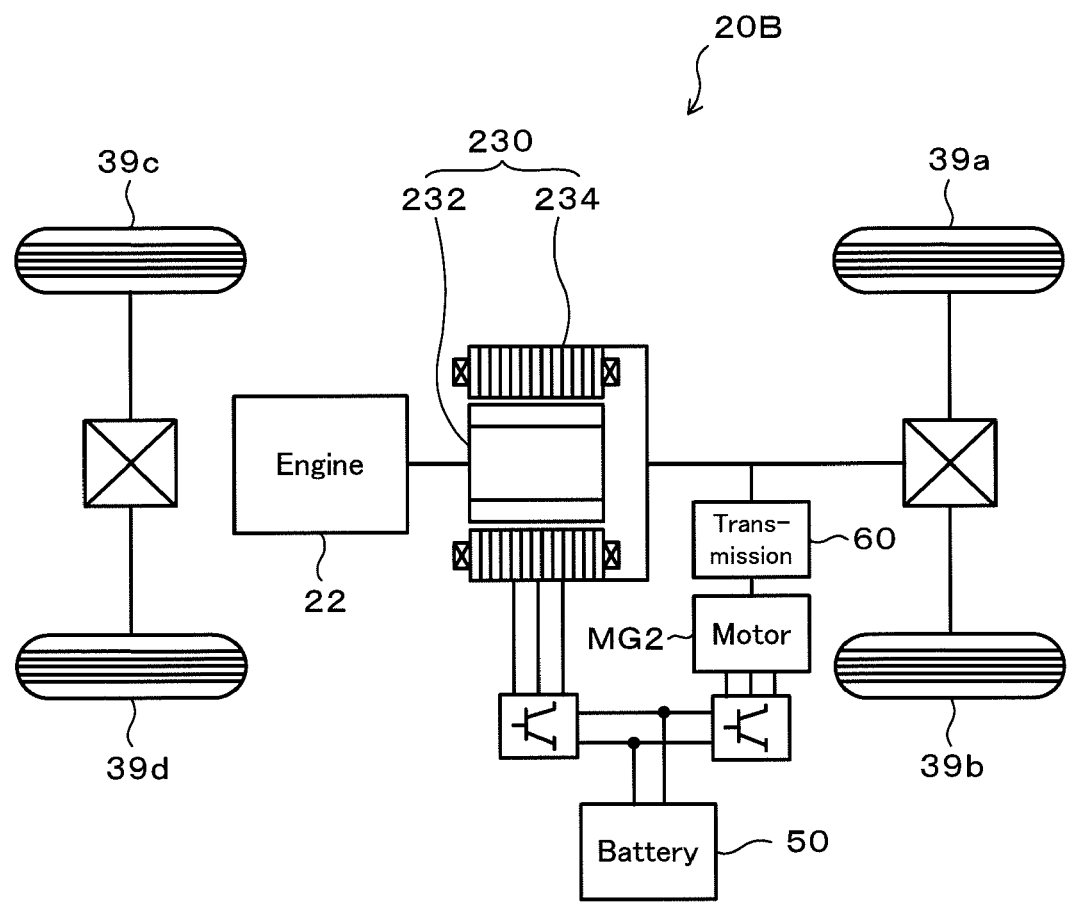
FIG. 9 is a schematic block diagram of a hybrid vehicle 20B according to a further modification of the present invention.

Although the hybrid vehicle 20 of the above described embodiment is a vehicle that outputs the power of the motor MG2 to an axle connected to the ring gear shaft 32$a$, an object for application of the present invention is not limited thereto. More specifically, as in the case of a hybrid vehicle 20A as a modification example shown in FIG. 8, the present invention may also be applied to a vehicle in which the power of the motor MG2 is output to an axle (axle connected to wheels 39$c$ and 39$d$ in FIG. 8) that is different from the axle (axle to which the wheels 39$a$ and 39$b$ are connected) that is connected to the ring gear shaft 32$a$. Further, although the hybrid vehicle 20 of the above described embodiment is a vehicle that outputs the power of the engine 22 to the ring gear shaft 32$a$ as an axle connected to the wheels 39$a$ and 39$b$ via the power distribution and integration mechanism 30, an object for application of the present invention is not limited thereto. More specifically, as in the case of a hybrid vehicle 20B as a modification example shown in FIG. 9, the present invention may also be applied to a vehicle that includes a pair-rotor motor 230 that has an inner rotor 232 connected to the crankshaft of the engine 22, and an outer rotor 234 connected to the axle that outputs the power to the wheels 39$a$ and 39$b$ and that transmits a part of the power output from the engine 22 to the axle while converting the remainder of the power into electric power.

Figure 10:
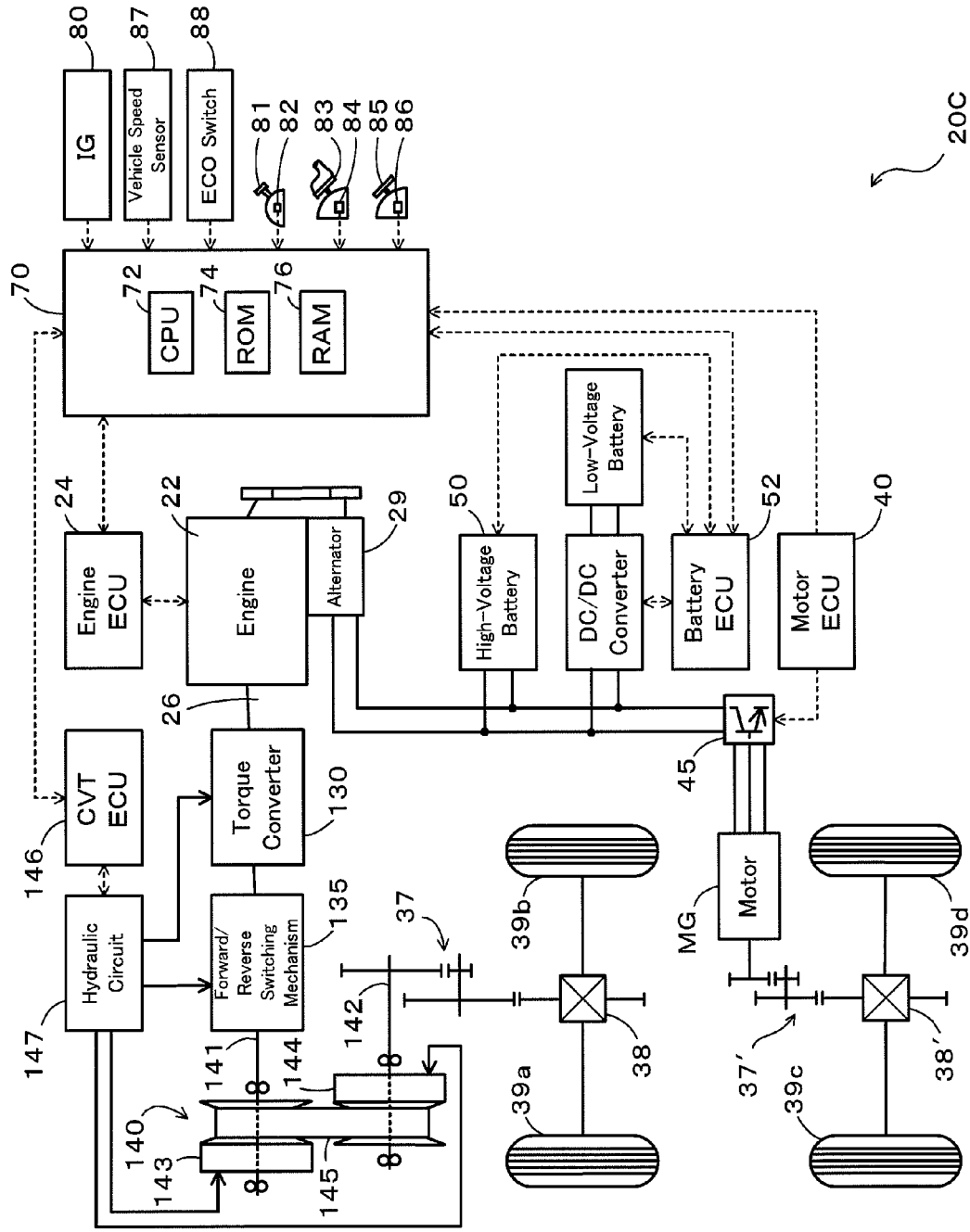
FIG. 10 is a schematic block diagram of a hybrid vehicle 20C according to a still further modification of the present invention.

The present invention may also be applied to a vehicle that includes a continuously variable transmission (hereinafter, referred to as "CVT") as a power transmitting mechanism that transmits the power from the engine 22 to the axle side instead of the power distribution and integration mechanism 30 in the hybrid vehicle 20 that has the ring gear 32 as the axle-side rotational element and the carrier 34 as the engine-side rotational element. A hybrid vehicle 20C that is one example of this kind of vehicle is illustrated in FIG. 10. The hybrid vehicle 20C as a modification example shown in FIG. 10 includes a front-wheel drive system that outputs the power from the engine 22 to, for example, wheels 39$a$ and 39$b$ that are front wheels via a torque converter 130, a forward/reverse switching mechanism 135, a belt-type CVT 140, a gear mechanism 37, a differential gear 38, and the like, a rear-wheel drive system that outputs power from a motor MG that is a synchronous motor generator to, for example, wheels 39$c$ and 39$d$ that are rear wheels via a gear mechanism 37', a differential gear 38' and the like, and a hybrid ECU 70 that controls the whole vehicle. In this case, the torque converter 130 is configured as a fluid-type torque converter that has a lock-up mechanism. Further, the forward/reverse switching mechanism 135 includes, for example, a double-pinion planetary gear mechanism, a brake and a clutch. The forward/ reverse switching mechanism 135 performs switching between forward and reverse movement and connection/disconnection of the torque converter 130 and the CVT 140. The CVT 140 has a primary pulley 143 capable of changing a groove width that is connected to an input shaft 141 as an engine-side rotational element, a secondary pulley 144 that is similarly capable of changing a groove width and is connected to an output shaft 142 as an axle-side rotational element, and a belt 145 that is wound around the primary pulley 143 and the secondary pulley 144. By changing the groove width of the primary pulley 143 and the secondary pulley 144 by means of hydraulic oil from a hydraulic circuit 147 that is driven and controlled by a CVT electronic control unit 146, the CVT 140 continuously changes the speed of the power input to the input shaft 141 and outputs the resulting power to the output shaft 142. Further, a toroidal-type CVT may be applied to the hybrid vehicle 20C shown in FIG. 10 instead of the belt-type CVT 140. The motor MG is connected to an alternator 29 that is driven by the engine 22 via an inverter 45, and is connected to a battery (high-voltage battery) 50 having an output terminal connected to a power line from the alternator 29. Thus, the motor MG is driven by power from the alternator 29 or the battery 50, and performs regeneration to charge the battery 50 with electric power that is generated thereby. The hybrid vehicle 20C constructed in this manner drives by outputting mainly power from the engine 22 to the wheels 39a and 39b that are front wheels in accordance with an operation of the accelerator pedal 83 by the driver, and, as necessary, drives by four-wheel driving in which, in addition to outputting the power to the wheels 39a and 39b, power from the motor MG is output to the wheels 39c and 39d that are the rear wheels.

Figure 11:
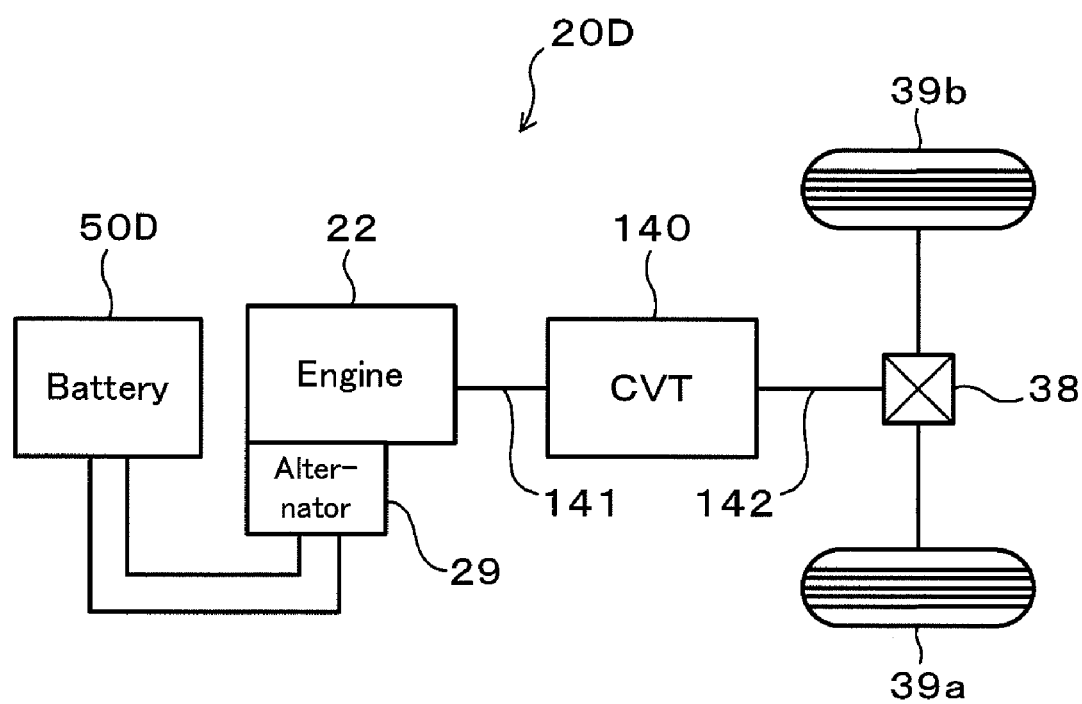
FIG. 11 is a schematic block diagram of a hybrid vehicle 20D according to a still further modification of the present invention.

Further, the present invention may also be applied to a series type hybrid vehicle (not shown). Further, the present invention may also be applied to a vehicle 20D exemplified in FIG. 11 transmitting power from the engine 22 to the wheels 39a and 39b through the CVT 140 and including a battery 50D charged with electric power generated by the alternator 29 that is driven by the engine 22.

The correlation between the principal elements of the embodiments and modification examples, and the principal elements of the invention described in the "Disclosure of the Invention" section will now be described. That is, in the above described embodiment and modification examples, the engine 22 capable of outputting power to the ring gear shaft 32a and the like corresponds to "internal combustion engine", the motor MG1, the pair-rotor motor 230 and the alternator 29 correspond to "generator", the battery 50 corresponds to "accumulator", the ECO switch 88 to select the ECO mode giving priority to fuel consumption rate rather than the reduction of noise and vibration corresponds to "fuel consumption rate priority mode selection switch", the hybrid ECU 70 and the like executing the drive control routine shown in FIG. 2 corresponds to "maximum allowable charging power setting module", "charging power demand setting module", "power demand setting module", and "control module", and the motors MG and MG2 correspond to "motor". In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The technique of the invention is preferably applied to the manufacturing industries of vehicles.

The invention claimed is:
1. A vehicle comprising:
an internal combustion engine capable of outputting power for driving;
a generator capable of generating electric power through the use of at least part of power from the internal combustion engine;
an accumulator capable of receiving electric power from the generator;
a fuel consumption rate priority mode selection switch to select a fuel consumption rate priority mode that gives priority to fuel consumption rate;
a maximum allowable charging power setting module configured to set a maximum allowable charging power based on a first relationship when the fuel consumption rate priority mode selection switch is turned off, the maximum allowable charging power being a maximum electric power allowed to charge the accumulator, the maximum allowable charging power setting module setting the maximum allowable charging power based on a second relationship having a tendency to allow charging of the accumulator in comparison with the first relationship when the fuel consumption rate priority mode selection switch is turned on;
a charging power demand setting module configured to set a charging power demand required for charging the accumulator within a range of the set maximum allowable charging power in accordance with a state of the accumulator;
a power demand setting module configured to set a power demand required for the vehicle; and
a control module configured to control the internal combustion engine and the generator so that the accumulator is charged with the set charging power demand and the set power demand is ensured.

2. A vehicle according to claim 1, further comprising:
a vehicle speed detecting unit that detects a vehicle speed of the vehicle;
wherein the first and second relationships respectively have a tendency to decrease the maximum allowable charging power as the detected vehicle speed decreases, and wherein the second relationship increases the maximum allowable charging power corresponding to same vehicle speed in comparison with the first relationship.

3. A vehicle according to claim 1, wherein the charging power demand setting module sets the charging power demand to a smaller one of a base charging electric power according to the state of the accumulator and the set maximum allowable charging power.

4. A vehicle according to claim 1, wherein the control module is capable of controlling the internal combustion engine based on a power demand including power required to ensure driving force demand for driving and power required to charge the accumulator with the set charging power demand so that the internal combustion engine is intermittently operated.

5. A vehicle according to claim 1, further comprising:
a motor capable of outputting power for driving to a predetermined axle through the use of at least electric power from the accumulator.

6. A vehicle according to claim 5, wherein the generator is a unit connected to the predetermined axle and an output shaft of the internal combustion engine and configured to input and output to the output shaft side and the axle side with input/output of electric power and mechanical power.

7. A vehicle according to claim 5, further comprising:
a continuously variable transmission capable of transmitting power from the internal combustion engine to the axle or another axle different from the axle.

8. A control method of a vehicle including an internal combustion engine capable of outputting power for driving, a generator capable of generating electric power through the use of at least part of power from the internal combustion engine, an accumulator capable of receiving electric power from the generator, and a fuel consumption rate priority mode selection switch to select a fuel consumption rate priority mode that gives priority to fuel consumption rate, the method comprising the steps of:

(a) setting a maximum allowable charging power based on a first relationship when the fuel consumption rate priority mode selection switch is turned off, the maximum allowable charging power being a maximum electric power allowed to charge the accumulator, the step (a) setting the maximum allowable charging power based on a second relationship having a tendency to allow charging of the accumulator in comparison with the first relationship when the fuel consumption rate priority mode selection switch is turned on;

(b) setting a charging power demand required for charging the accumulator within a range of the maximum allowable charging power set at the step (a) in accordance with a state of the accumulator; and (c) controlling the internal combustion engine and the generator so that the accumulator is charged with the charging power demand set at the step (b) and power demand required for the vehicle is ensured.

9. A control method of a vehicle according to claim 8, wherein the first and second relationships used at the step (a) respectively have a tendency to decrease the maximum allowable charging power as a vehicle speed decreases, and wherein the second relationship increases the maximum allowable charging power corresponding to same vehicle speed in comparison with the first relationship.

10. A control method of a vehicle according to claim 8, wherein the step (b) sets the charging power demand to a smaller one of a base charging electric power according to the state of the accumulator and the set maximum allowable charging power.

* * * * *